United States Patent
Agarwal et al.

(10) Patent No.: US 9,053,182 B2
(45) Date of Patent: Jun. 9, 2015

(54) SYSTEM AND METHOD FOR MAKING USER GENERATED AUDIO CONTENT ON THE SPOKEN WEB NAVIGABLE BY COMMUNITY TAGGING

(75) Inventors: Sheetal Agarwal, Maharashtra (IN); Anupam Jain, Gurgaon (IN); Arun Kumar, Noida (IN); Amit Anil Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 13/014,872

(22) Filed: Jan. 27, 2011

(65) Prior Publication Data
US 2012/0197999 A1    Aug. 2, 2012

(51) Int. Cl.
*G06F 17/30* (2006.01)

(52) U.S. Cl.
CPC .... *G06F 17/30755* (2013.01); *G06F 17/30899* (2013.01); *G06F 17/3074* (2013.01); *G06F 17/30778* (2013.01); *G06F 17/30775* (2013.01); *G06F 17/30902* (2013.01)

(58) Field of Classification Search
CPC ............ G06F 17/3074–17/30778; G06F 17/3089–17/30923
USPC .................................. 707/999.102
See application file for complete search history.

(56) References Cited

U.S. PATENT DOCUMENTS

| | | | |
|---|---|---|---|
| 6,442,566 B1 * | 8/2002 | Atman et al. | 707/603 |
| 6,460,057 B1 | 10/2002 | Butler et al. | |
| 6,684,218 B1 * | 1/2004 | Santos et al. | 1/1 |
| 6,778,982 B1 * | 8/2004 | Knight et al. | 707/737 |
| 7,181,438 B1 * | 2/2007 | Szabo | 1/1 |
| 7,284,196 B2 * | 10/2007 | Skeen et al. | 715/234 |
| 7,389,230 B1 | 6/2008 | Nelken | |
| 7,577,683 B2 * | 8/2009 | Cho et al. | 1/1 |
| 7,599,938 B1 | 10/2009 | Harrison et al. | |
| 7,870,135 B1 * | 1/2011 | Cheung | 707/737 |
| 8,880,529 B2 * | 11/2014 | Klar et al. | 707/738 |
| 2001/0032234 A1 * | 10/2001 | Summers et al. | 709/201 |
| 2003/0039341 A1 * | 2/2003 | Burg et al. | 379/88.16 |

(Continued)

FOREIGN PATENT DOCUMENTS

WO    2009081861    7/2009

OTHER PUBLICATIONS

Eckert, K. et al., Crowdsourcing the Assembly of Concept Hierarchies. Jun. 21-25, 2010. Proceedings of the 10th annual joint conference on Digital libraries, pp. 139-148, ACM.*

(Continued)

*Primary Examiner* — Jason K. Gee
*Assistant Examiner* — Zhimei Zhu
(74) *Attorney, Agent, or Firm* — Ference & Associates LLC

(57) ABSTRACT

Methods and arrangements for creating and building subcategories in a user-based voice application. User posts are appended to a category in a voice application and subdivision of the category is prompted upon satisfaction of a first condition. The category is designated as a parent category, and at least one subcategory nomination are solicited from users. User input is solicited on appending at least one nominated subcategory to the parent category, and a nominated subcategory is appended to the parent category upon satisfaction of a second condition. User input is solicited to reassign a user post from the parent category to at least one subcategory.

11 Claims, 7 Drawing Sheets

(56) References Cited

U.S. PATENT DOCUMENTS

| | | |
|---|---|---|
| 2003/0158739 A1 | 8/2003 | Moody et al. |
| 2003/0163597 A1* | 8/2003 | Hellman et al. ............... 709/316 |
| 2004/0267694 A1* | 12/2004 | Sakai et al. ...................... 707/1 |
| 2007/0081197 A1* | 4/2007 | Omoigui ........................ 358/403 |
| 2007/0121837 A1* | 5/2007 | Bushey et al. ................. 379/111 |
| 2007/0156677 A1* | 7/2007 | Szabo .............................. 707/5 |
| 2007/0162761 A1 | 7/2007 | Davis et al. |
| 2007/0177606 A1 | 8/2007 | Jabri et al. |
| 2007/0177616 A1 | 8/2007 | Jabri et al. |
| 2007/0180135 A1 | 8/2007 | Kenrick et al. |
| 2008/0052262 A1* | 2/2008 | Kosinov et al. .................. 707/1 |
| 2008/0098005 A1* | 4/2008 | Goradia ......................... 707/10 |
| 2008/0144783 A1* | 6/2008 | Kumar et al. ............... 379/88.13 |
| 2008/0187109 A1* | 8/2008 | Meng et al. ................. 379/88.01 |
| 2008/0192736 A1 | 8/2008 | Jabri et al. |
| 2008/0201133 A1 | 8/2008 | Cave et al. |
| 2008/0205789 A1* | 8/2008 | Ten Kate et al. .............. 382/284 |
| 2008/0228488 A1 | 9/2008 | Berkowitz et al. |
| 2008/0228774 A1* | 9/2008 | Hamilton et al. .............. 707/10 |
| 2008/0281915 A1* | 11/2008 | Elad et al. ..................... 709/204 |
| 2008/0320002 A1* | 12/2008 | Bodlaender et al. ............ 707/10 |
| 2009/0077025 A1* | 3/2009 | Brooks et al. .................... 707/3 |
| 2009/0132285 A1 | 5/2009 | Jakobovits ........................ 705/3 |
| 2009/0138262 A1* | 5/2009 | Agarwal et al. ............... 704/235 |
| 2009/0138427 A1* | 5/2009 | Kalavade .......................... 707/1 |
| 2009/0156171 A1* | 6/2009 | Yasrebi et al. ............. 455/412.2 |
| 2009/0157614 A1* | 6/2009 | Smith et al. ...................... 707/3 |
| 2009/0216577 A1* | 8/2009 | Killebrew ......................... 705/7 |
| 2009/0240652 A1 | 9/2009 | Su et al. |
| 2010/0017259 A1* | 1/2010 | Luo ................................ 705/10 |
| 2010/0057743 A1* | 3/2010 | Pierce ........................... 707/10 |
| 2010/0082576 A1* | 4/2010 | Walker et al. ................ 707/706 |
| 2010/0158218 A1 | 6/2010 | Dhawan et al. |
| 2010/0306079 A1* | 12/2010 | Zmolek ........................ 705/26.5 |
| 2011/0276581 A1* | 11/2011 | Zelevinsky ................... 707/766 |
| 2011/0282878 A1* | 11/2011 | Bird et al. ..................... 707/740 |
| 2012/0079372 A1* | 3/2012 | Kandekar et al. ............. 715/256 |
| 2012/0147265 A1* | 6/2012 | Gu et al. ........................ 348/473 |
| 2012/0191716 A1* | 7/2012 | Omoigui ....................... 707/740 |
| 2012/0236201 A1* | 9/2012 | Larsen et al. ................. 348/468 |
| 2012/0303629 A1* | 11/2012 | Klein et al. ................... 707/741 |
| 2012/0324015 A1* | 12/2012 | Agarwal et al. ............... 709/204 |
| 2013/0011062 A1* | 1/2013 | Conwell et al. ............... 382/173 |
| 2013/0013608 A1* | 1/2013 | Bird et al. ..................... 707/737 |
| 2013/0063613 A1* | 3/2013 | Conwell ................... 348/207.99 |

OTHER PUBLICATIONS

Niepert, M. et al. A Dynamic Ontology for a Dynamic Reference Work. Jun. 18-23, 2007. Proceedings of the 7th ACM/IEEE-CS joint oint conference on Digital libraries, pp. 288-297, ACM.*

Xu Zhang, Yi-Cheng Song, Juan Cao, Yong-Dong Zhang, and Jin-Tao Li. 2009. Large scale incremental web video categorization. In Proceedings of the 1st workshop on Web-scale multimedia corpus (WSMC '09). ACM, New York, NY, USA, 33-40.*

Kotkar, Pratik, et al., "An Audio Wiki for Publishing User-Generated Content in the Developing World", 2 pages HCI for Community and International Devetopment, Workshop at CHI, Apr. 5-6, 2008, Florence, italy.

Patel, Neil, "Designing and Evaluating Voice-Based Virtual Communities", pp. 2963-2966, CHI 201, Apr. 10-15, 2010, Atlanta, Georgia, USA.

Arons, Barry, "Hyperspeech: Navigating in Speech-Only Hypermedia", pp. 133-146, Proceedings of the Third Annual ACM Conference on Hypertext, San Antonio, Texas, Dec. 1991.

Choi, John et al., "Spoken Content-Based Audio Navigation (SCAN)", 4 pages, Proceedings of the Third Annual ACM Conference on Hypertext, San Antonio, Texas, Dec. 1991.

Blackburn, Steven, et al., "A Tool for Content Based Navigation of Music", 8 pages, Proceedings of the Sixth AMC International Conference on Multimedia, Bristol, UK, 1998.

Bacchiani, Michiel, et al., "SCANMail: Audio Navigation in the Voicemail Domain", 3 pages, Proceedings of the First International Conference on Human Language Technology Research, San Diego, California, 2001.

Wold, Erling, et al. "Content-Based Classification, Search, and Retrieval of Audio", pp. 27-36, Multimedia, IEEE, 1996.

Amazon Mechanical Turk Requestor—Resource Center, https://requester.mturk.com/mturk/welcome, available on Dec. 1, 2010, 1 page.

Ambati, Vamshi, et al., "Active Learning and Crowd-Sourcing for Machine Translation", pp. 2169-2174. Proceedings of the Seventh Conference on International Language Resources and Evaluation, May 19-21, 2010, Valletta, Malta.

* cited by examiner

SYSTEM AND METHOD FOR MAKING USER GENERATED AUDIO CONTENT ON THE SPOKEN WEB NAVIGABLE BY COMMUNITY TAGGING

BACKGROUND

The creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a user may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

More particularly, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone). Generally, VoiceSites contain an ample amount user generated content, this mainly being contained in the form of audio lists which have to be browsed linearly via telephone.

As such, in the context of VoiceSites, audio lists do tend to get longer over time, with no efficient mechanism available to organize the content, given its audio nature and length of the list. Categorization can normally be performed before the query is recorded so that the user can select a category, but problems are presented in connection with not knowing what the user will record. Sub-categories need to be created depending on the recorded content. Additionally, meta-information is generally unavailable; usually this amounts to little more than the author's phone number and a timestamp. Speech-to-text systems also tend not to be reliable in the VoiceSites context (or other related or analogous contexts), resulting in a paucity of information about content.

BRIEF SUMMARY

In summary, one aspect of the invention provides a method comprising: appending user posts to a category in a voice application; prompting subdivision of the category upon satisfaction of a first condition; designating the category as a parent category; soliciting at least one subcategory nomination from users; soliciting user input on appending at least one nominated subcategory to the parent category; appending a nominated subcategory to the parent category upon satisfaction of a second condition; and soliciting user input to reassign a user post from the parent category to at least one subcategory.

Another aspect of the invention provides an apparatus comprising: at least one processor; and a computer readable storage medium having computer readable program code embodied therewith and executable by the at least one processor, the computer readable program code comprising: computer readable program code configured to append user posts to a category in a voice application; computer readable program code configured to prompt subdivision of the category upon satisfaction of a first condition; computer readable program code configured to designate the category as a parent category; computer readable program code configured to solicit at least one subcategory nomination from users; computer readable program code configured to solicit user input on appending at least one nominated subcategory to the parent category; computer readable program code configured to append a nominated subcategory to the parent category upon satisfaction of a second condition; and computer readable program code configured to solicit user input to reassign a user post from the parent category to at least one subcategory.

An additional aspect of the invention provides a computer program product comprising: a computer readable storage medium having computer readable program code embodied therewith, the computer readable program code comprising: computer readable program code configured to append user posts to a category in a voice application; computer readable program code configured to prompt subdivision of the category upon satisfaction of a first condition; computer readable program code configured to designate the category as a parent category; computer readable program code configured to solicit at least one subcategory nomination from users; computer readable program code configured to solicit user input on appending at least one nominated subcategory to the parent category; computer readable program code configured to append a nominated subcategory to the parent category upon satisfaction of a second condition; and computer readable program code configured to solicit user input to reassign a user post from the parent category to at least one subcategory.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
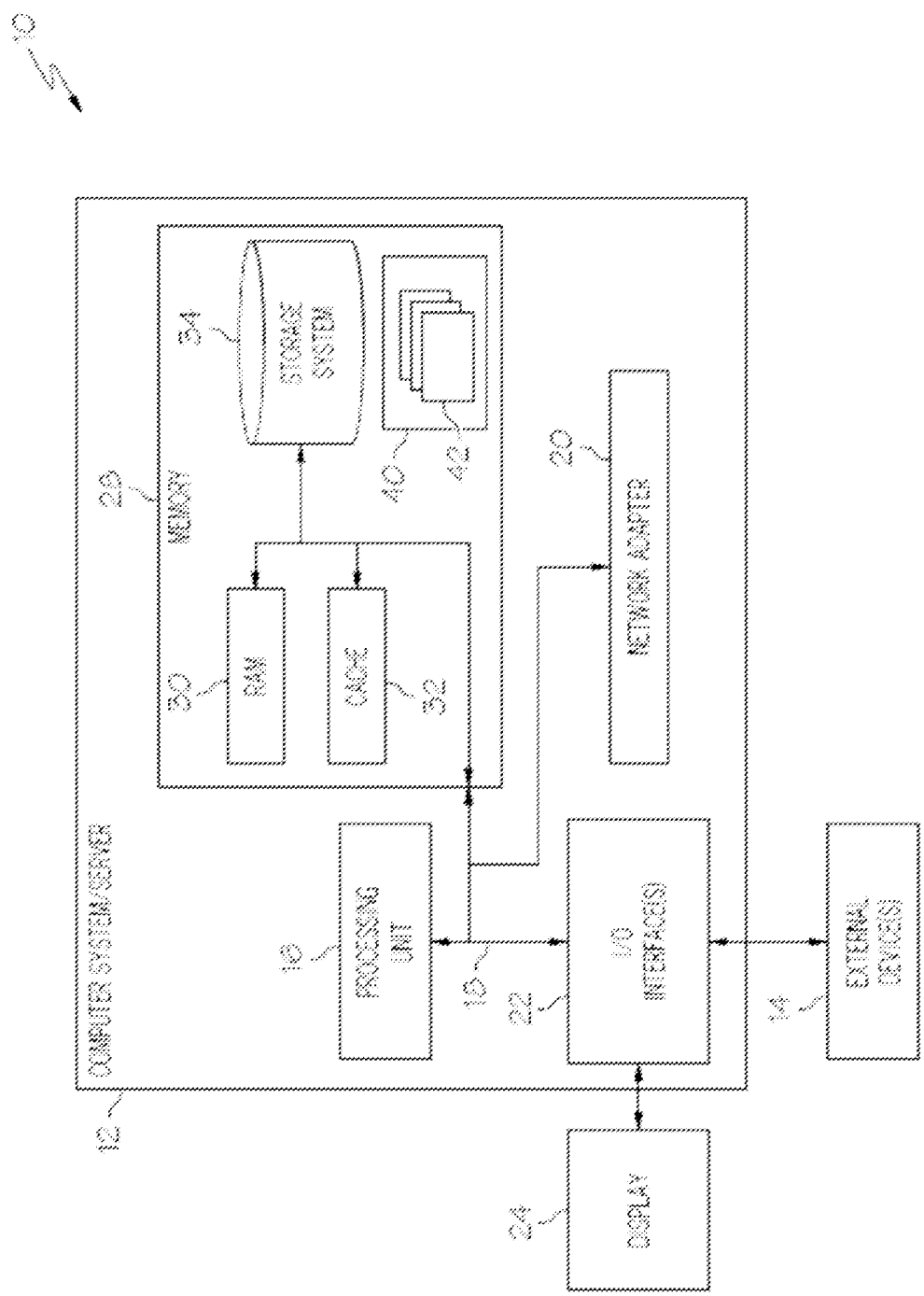
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-6 can be performed or utilized by way of a processing unit or units and system memory such as those indicated, respectively, at 16 and 28 in FIG. 1, whether on a server computer, a client computer, a node computer in a distributed network, or any combination thereof.

In accordance with at least one embodiment of the invention, in a voice application with a capability for user generated content (such as VoiceSites), audio lists automatically become candidates for categorization. Users suggest and record categories, while other users validate and/or finalize the implementation of such categories via a voting scheme. As a result, ASR (Automatic Speech Recognition) and Speech-to-Text requirements are bypassed. A similar solution applies for moving elements from one category to another, while provisions are available for merging duplicate categories and adding the same post to more than one category.

Figure 2:
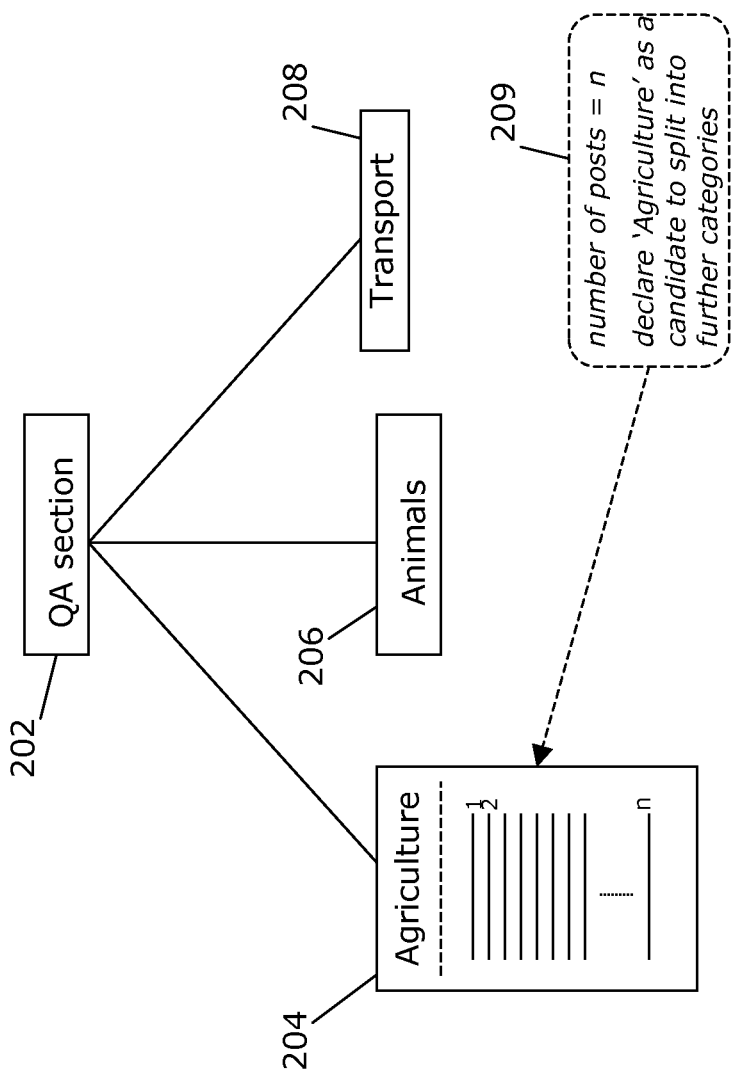
FIG. 2 schematically illustrates an arrangement for creating and building subcategories in a user-based voice application FIG. 3 schematically illustrates a further stage in which users vote on subcategories.
Figure 3:
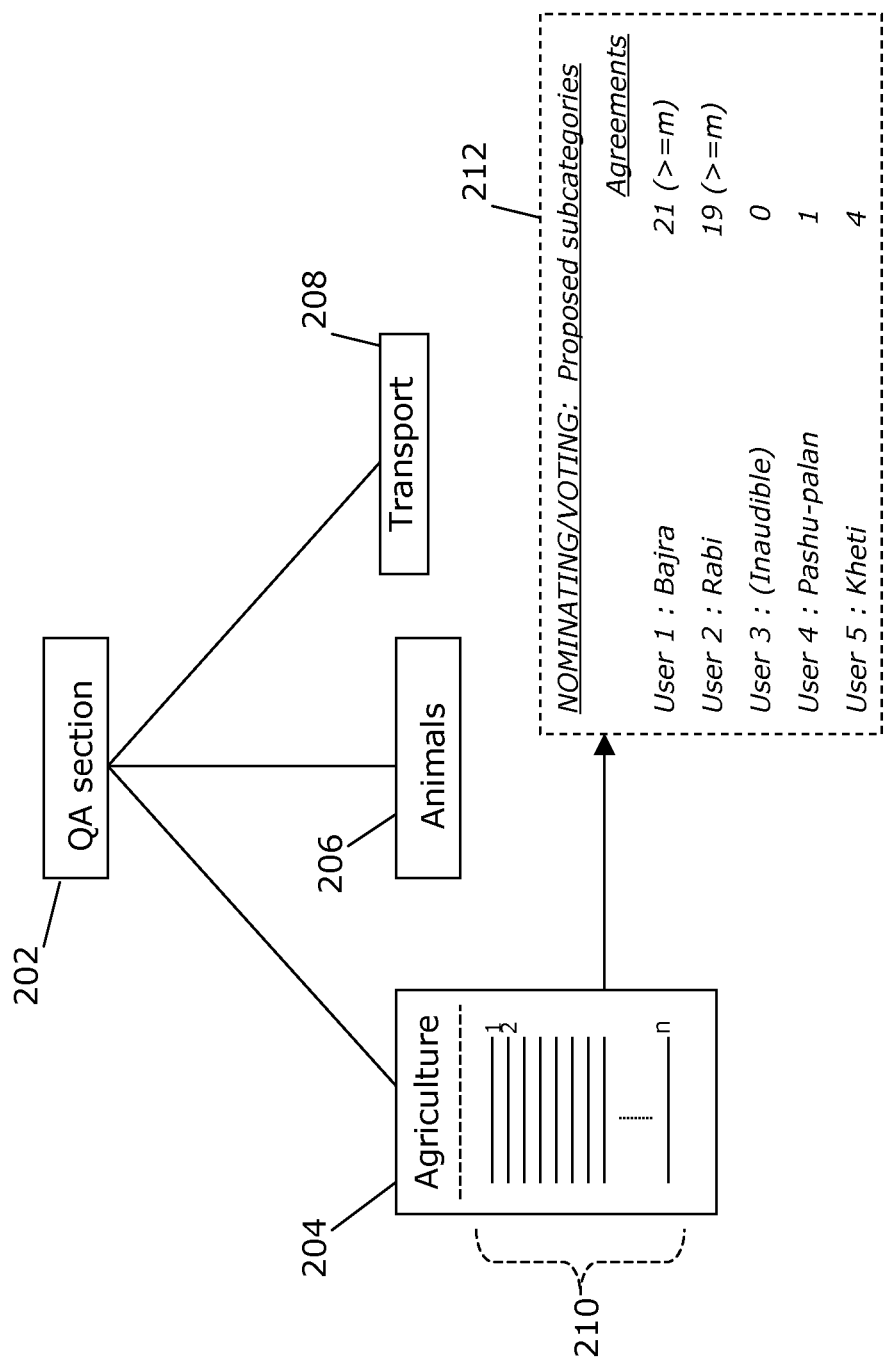

In accordance with at least one embodiment of the invention, and as shown schematically in FIGS. 2 and 3, a user suggests categories in a manner now to be described.

In the illustrative and non-restrictive example of FIG. 2, QA section 202 in a voice application with a capability for user generated content (such as VoiceSites) includes three categories: Agriculture 204, Animals 206 and Transport 208. Over time, users append posts to the three categories 204/206/208. If the number of user posts 210 in an existing category reaches a threshold n, then that category becomes a candidate to be split into further categories. As shown in FIG. 2, the number of posts 210 in category Agriculture 204 has reached the threshold n (211); thus, Agriculture 204 is declared as a candidate to split into further categories.

FIG. 3 schematically illustrates a further stage in which users vote on subcategories into which a threshold-satisfying category (e.g., Agriculture 204) can be split. Particularly, at the moment that a category reaches threshold n (e.g., Agriculture 204), users can either then or over time voluntarily suggest sub-categories for undertaking a split. As such, once one or more subcategories are proposed, subsequent users are able to either suggest yet another subcategory or express agreement with one already proposed. The voice application can convey and prompt these inquiries to users in essentially any suitable manner; users may respond, e.g., by uttering a newly proposed category verbally or expressing agreement with an already proposed category verbally or via touch-tone.

In accordance with at least one embodiment of the invention, a user votes once for a suggested category, but can vote for multiple categories. However, a user could change any vote of his or hers at a later time. Also, the number of subcategories, or time available for creating the same, can optionally be capped, such that a capability for users to suggest subcategories is stopped after a predetermined time period or upon reaching a predetermined threshold number of categories. However, even in the absence of either type of cap it can be found that the rate of increase in the number of new subcategories will decay over time in any event, in that a dynamic structure is being created by users and viable options for new subcategories may well end up being exhausted. In other words, users will likely tend not to new sub categories over time, to the extent such new ones may not be needed, or at least may tend to refrain from voting on newly proposed subcategories that may be perceived as irrelevant.

Once the number of agreements on a subcategory reach a predetermined threshold m, then that subcategory can be defined as a subcategory of the existing category Accordingly, as illustrated with regard to an illustrative and non-restrictive embodiment of the invention as shown in FIG. 3, a twofold step of nominating and voting takes place (212). Here, five users (Users 1-5) propose (or suggest or "nominate") distinct suggestions for subcategories, namely, Bajra, Rabi, one that is inaudible (e.g., due to a poor connection), Pashu-palan and Kheti. This nomination stage is followed by voting where, as shown, Bajra and Rabi both satisfy threshold m (e.g., a number of votes greater than or equal to 19) while the others fail to satisfy the threshold (as shown, 0 for the inaudible entry, 1 for Pashu-palan and 4 for Kheti).

Figure 4:
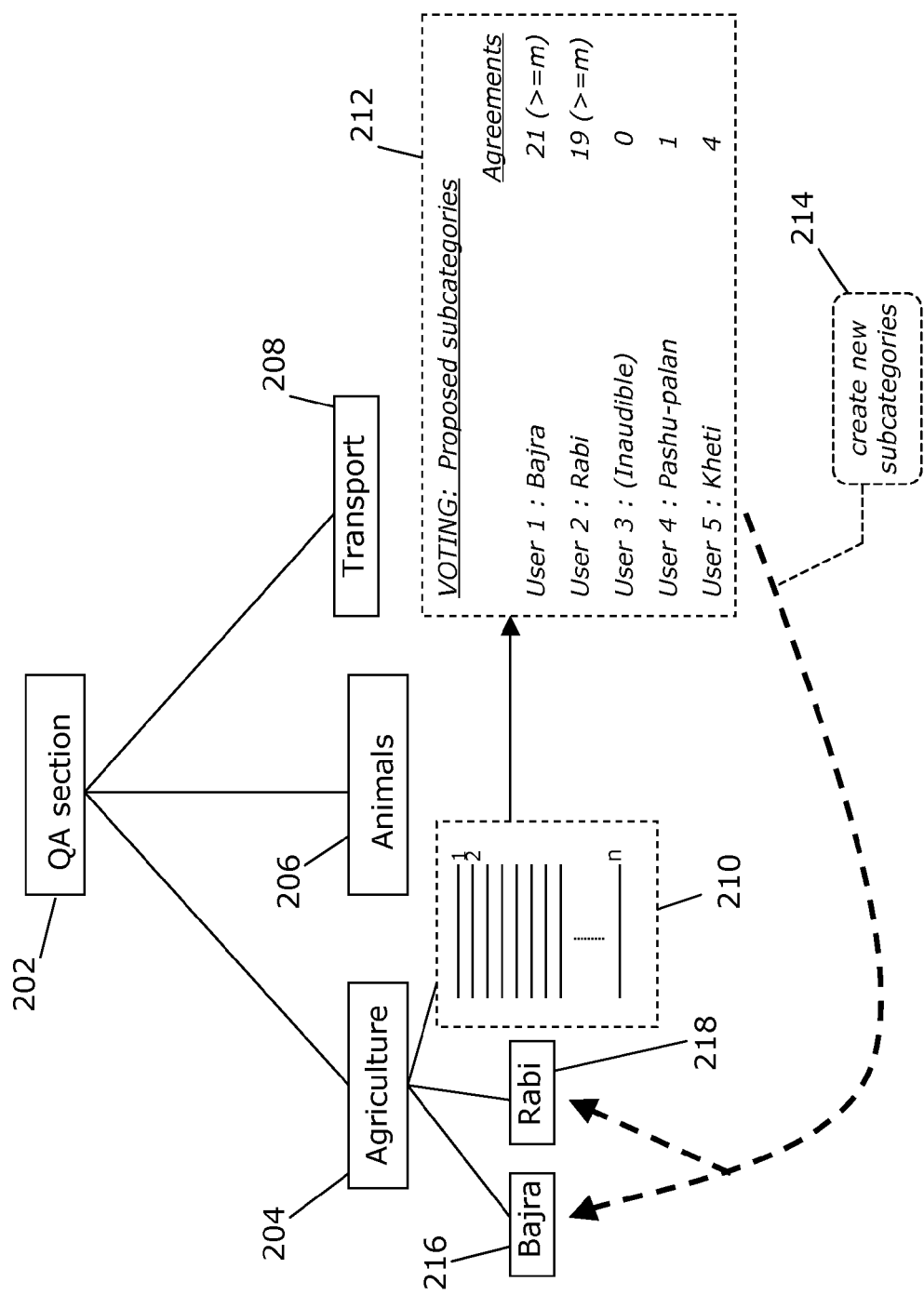
FIG. 4 schematically illustrates the creation of new subcategories.

As shown in FIG. 4, with regard to an illustrative and non-restrictive example in accordance with at least one embodiment of the invention, the two subcategories which satisfy threshold m are then ascertained as such and created (214) so that they enter the system as an integral part of the voice application Thus, Bajra and Rabi become dependents or subcategories (216 and 218, respectively) of parent category Agriculture 204. When a user then visits the voice application, then the new subcategories will be available in the tree and the system will automatically ask the user if he/she wishes to visit those or other subcategories.

Figure 5:
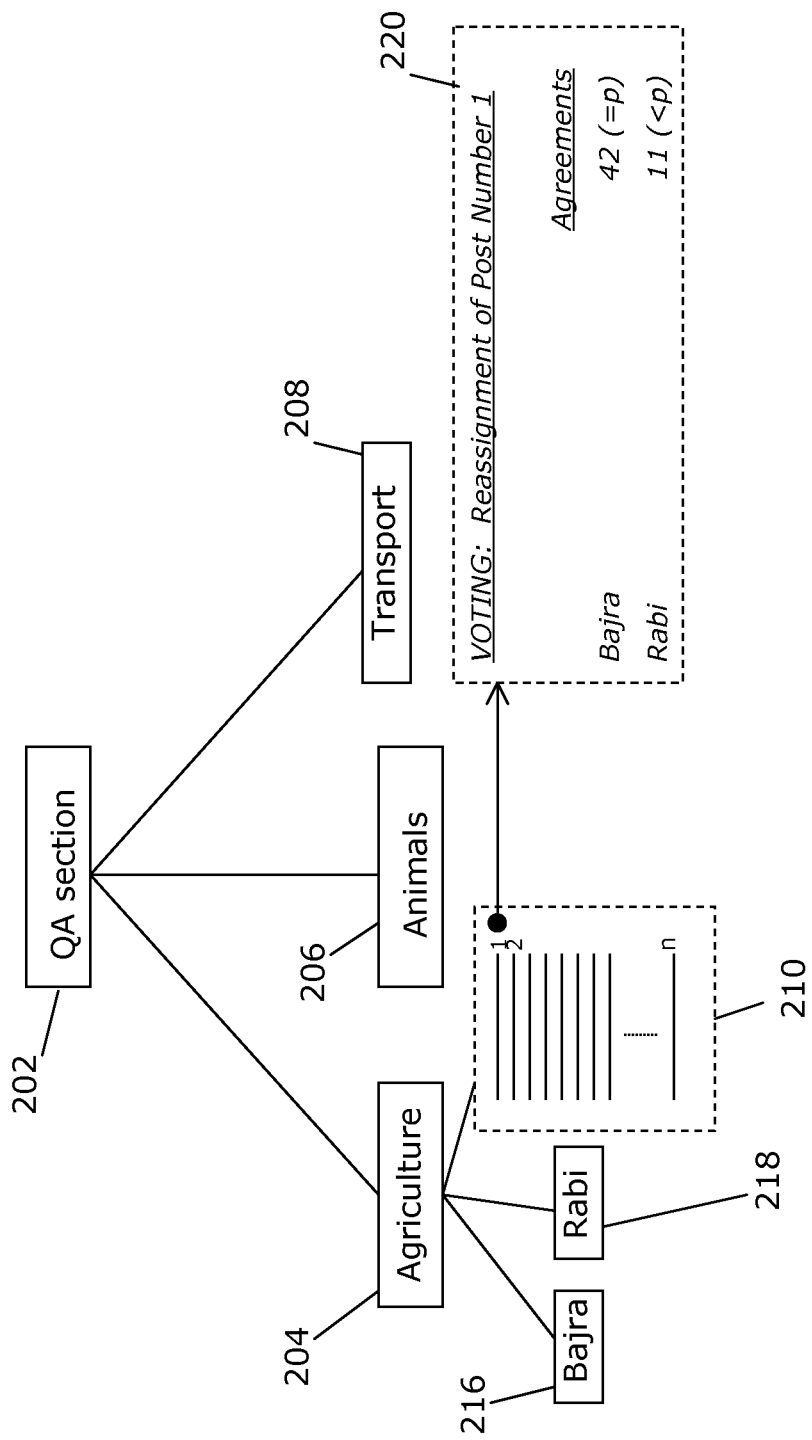
FIG. 5 schematically illustrates a stage of building subcategories involving user voting.

In accordance with at least one embodiment of the invention, and as shown schematically in FIG. 5, users assign content to categories in a manner now to be described.

Figure 6:
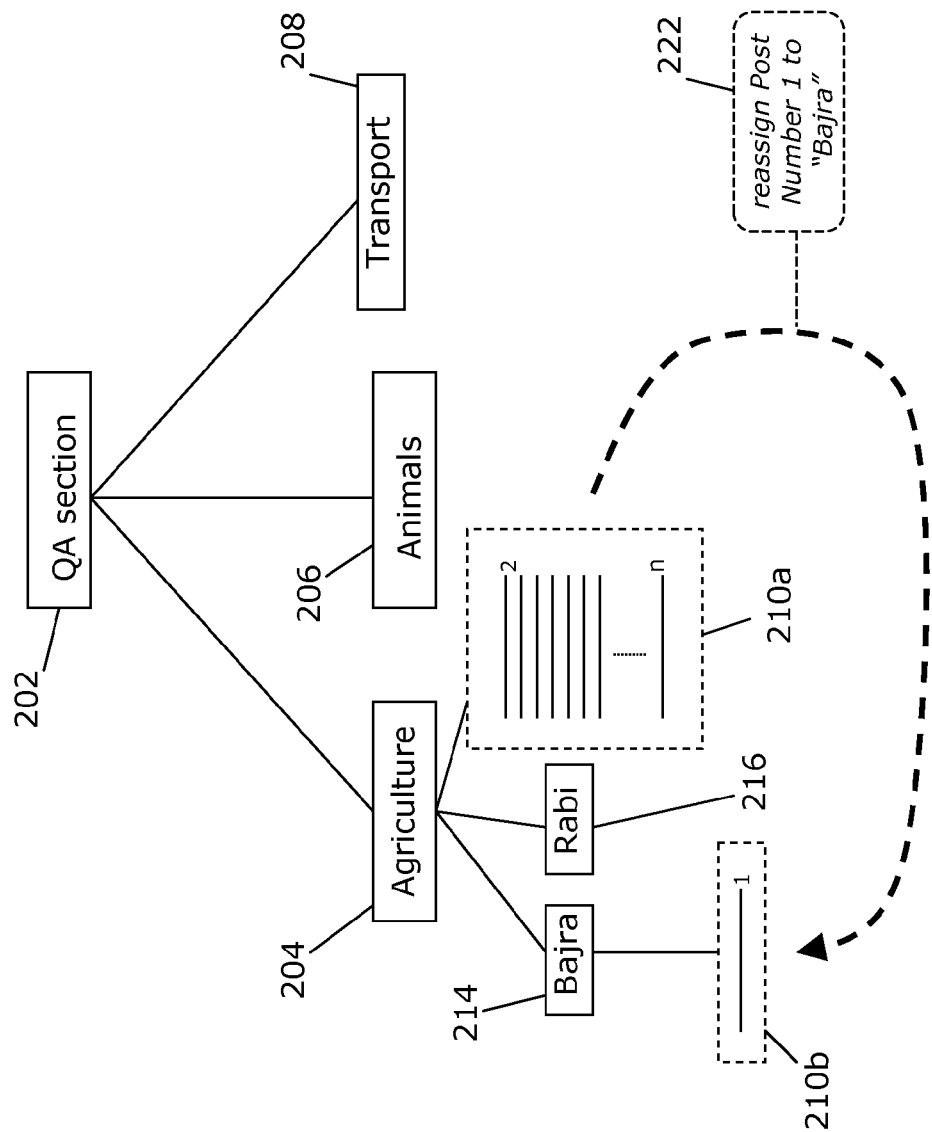
FIG. 6 schematically illustrates the reassignment of a user post to a subcategory.

Essentially, in accordance with the illustrative and non-restrictive example shown, inasmuch as two new subcategories (Bajra 216 and Rabi 218) have been newly created, users can then suggest, one at a time, a subcategory destination for each of the existing posts 210 of category Agriculture 204. Users can also choose to keep a post "unassigned", in that they need not necessarily categorize each and every post. Here, users are offered the choices between Bajra 216 and Rabi 218; once one of these receives a predetermined threshold of p agreements or votes (e.g., 42), that post is moved to the suggested sub-category. The example of FIG. 5 shows that Bajra (216) indeed has met a threshold p of 42 votes (with Rabi [218] only having accumulated 11 votes up to that point) Accordingly, as shown in FIG. 6, the post (Number 1) 210b is reassigned (222) from the original list of posts 210a and is appended to the Bajra subcategory 214.

By way of a variant embodiment in accordance with the invention, a user can designate multiple categories for a single post. As a consequence of consolidation of the votes, one post may apply to more than one category. In other words, if a given individual post 210 p or more votes for a first category and also p or more votes for a second category, then the post is assigned to both of the first and second categories.

By way of a variant embodiment in accordance with the invention, if two suggested subcategories (spoken in audio) are the same or otherwise very similar to one another, then users can suggest to merge them together, which can then be validated by unique votes from the users. In other words, the suggestion to merge becomes an option on which to vote. In another variant, if over time two categories appear similar or contain very few posts, users can suggest to merge them together, which can then also be validated by votes from users. To elaborate, a user may find it worthwhile during a voting phase (where final subcategories are being chosen) to suggest a merger of two suggested subcategories. However, if a user should realize that two categories are virtually the same, or similar enough to warrant a merger, after subcategories have been finalized, then a merger step can be taken at that point as well In accordance with at least one embodiment of the invention, related content (e.g., comments/responses to a post) can also be flagged with the same category, leading to taxonomies of audio content. New ontologies/semantic models can be derived from the content as more and more audio content is tagged and validating by the community through voting. In other words, for each post, other users can post comments and responses that can also get tagged with the same subcategory as the original post. As more and more related content is tagged, semantic relationships can be derived among different posts, leading to new ontologies and semantic models.

In accordance with a variant embodiment of the invention, users can choose to have their own personalized user-specific categories that can be structured and accessed as per their preferences. These can be built based solely on a particular user's votes. This can be extended to custom categories for a group of people. Thus, for example, if a user A votes for a category X, he/she may choose his/her categories and assigned posts to appear when he or she subsequently accesses the voice application anew. The system can recognize his number, e.g., based on standard technology such as caller ID. Accordingly, irrespective of what others may vote for, the user has an option to still use the categories and subcategories defined by his own votes.

In accordance with a variant embodiment of the invention, in order to facilitate the iterative refinement of categories, there could be several rounds of voting. For instance, any subcategory that receives votes satisfying a predetermined threshold can be transitioned to a "high vote" category. Further voting on an already categorized content (with votes above a threshold) could lead to one of the following: creation of a new category (where this content gets copied); creation of a sub category (leading to creation of a hierarchical taxonomy); and correction of incorrect categorization done in a previous round.

In accordance with a variant embodiment of the invention, categorization along multiple dimensions can be facilitated by the system along facets of interest. Thus, for instance, instead of querying as to the category to which an item or post belongs, the system can present other types of categorization questions (e.g., "Which period does it belong to ?", "Who has posted this ?", "What is your satisfaction level for this content ?", "Which domain this content belong to ?", etc.)

Figure 7:
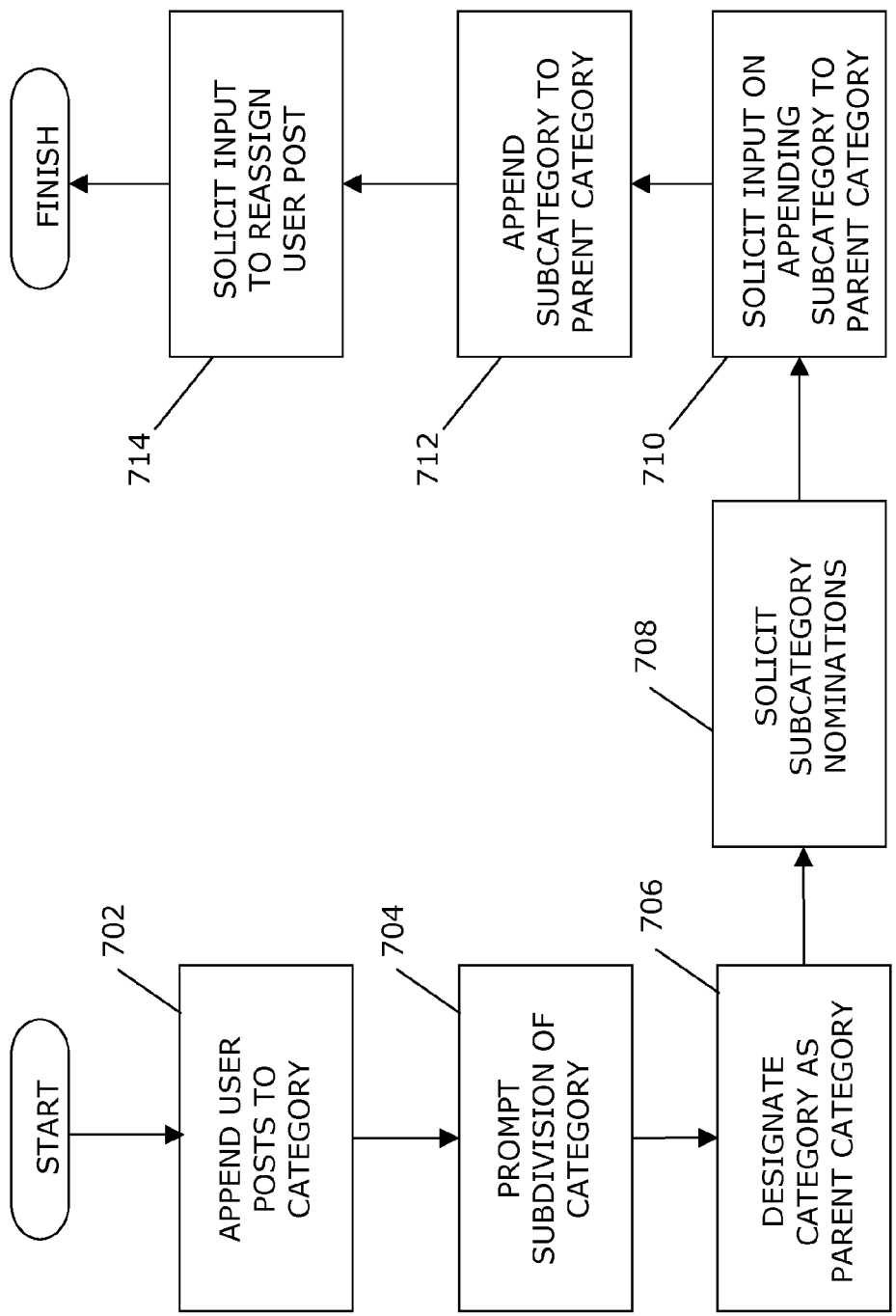
FIG. 7 sets forth a process more generally for creating and building subcategories in a user-based voice application

FIG. 7 sets forth a process more generally for creating and building subcategories in a user-based voice application, in accordance with at least one embodiment of the invention. It should be appreciated that a process such as that broadly illustrated in FIG. 7 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 7 can be performed by way a processing unit or units and system memory such as those indicated, respectively, at 16 and 28 in FIG. 1.

As shown in FIG. 7, user posts are appended to a category in a voice application (702) and subdivision of the category is prompted upon satisfaction of a first condition (704). The category is designated as a parent category (706), and one or more subcategory nominations are solicited from users (708). User input is solicited on appending one or more nominated subcategories to the parent category (710), and a nominated subcategory is appended to the parent category upon satisfaction of a second condition (712). User input is solicited to reassign a user post from the parent category to one or more subcategories (714).

It can be appreciated from the foregoing that, in accordance with at least one embodiment of the invention, an entire category tree can self-evolve as and when complexity of the tree increases. Further, some advantages in accordance with at least one embodiment of the invention can now be appreciated. Generally, many conventional efforts relate to content-related navigation, which mostly depends on conversion of speech to text. This is not feasible as yet for "user-generated audio content" in different languages, accents and dialects, whereas embodiments of the invention are "friendly" to different languages, accents and dialects in that content can be created on voice applications locally, or among people in a local region, so that content generators and consumers can and do end up using the same language, dialect and, to some extent, accent. Other conventional efforts relate merely to crowdsourcing where users translate content, label content, edit documents etc. collectively. However, to consolidate user input most of these techniques use string matching whose counterpart in speech is not very advanced especially in different languages.

In further recapitulation, it can also now be appreciated that, in accordance with at least one embodiment of the invention, user inputs are consolidated by encouraging users to vote on recorded audio and use the same recorded audio as the category labels for the content. In essence the system does not know what the categories are, but the content is still categorized (bypassing ASR inaccuracies).

Generally, there are broadly contemplated herein, in accordance with at least one embodiment of the invention, systems and methods for rendering user-generated audio content on the spoken web navigable by community tagging. Essentially, in accordance with at least one embodiment of the invention, a user-generated audio list or element in a voice application (such as a VoiceSite) is categorized by users using speech, where a recorded category is voted on by community users to validate categorizations. Any category that reaches n number of posts automatically becomes a candidate for categorization using community tagging and community votes. The community suggests names for subcategories, each of which may then be validated, or not, based on voting from other users.

Speech recognition inaccuracies can be avoided in that, in accordance with at least one embodiment, the categories are recorded by the users, voted by the users, and played back to the users as-is.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a computer readable storage medium having computer readable program code embodied therewith and executable by the at least one processor, the computer readable program code comprising:
   computer readable program code configured to append user posts to a category in a voice application, the voice application including a voice-driven application platform and a plurality of voice-driven application sites, the category comprising an audio list which is browsed linearly;
   computer readable program code configured to prompt subdivision of the category upon satisfaction of a first condition;
   computer readable program code configured to designate the category as a parent category;

computer readable program code configured to solicit at least one subcategory nomination from users;

computer readable program code configured to solicit user input on appending at least one nominated subcategory to the parent category;

computer readable program code configured to append a nominated subcategory to the parent category upon satisfaction of a second condition;

wherein the second condition is a threshold comprising a predetermined number of user votes; and computer readable program code configured to solicit user input to reassign a user post from the parent category to at least one subcategory;

wherein soliciting user input on appending at least one nominated subcategory comprises soliciting user votes through the voice application.

2. A computer program product comprising:

a non-transitory computer readable storage medium having computer readable program code embodied therewith, the computer readable program code comprising:

computer readable program code configured to append user posts to a category in a voice application, the voice application including a voice-driven application platform and a plurality of voice-driven application sites, the category comprising an audio list which is browsed linearly;

computer readable program code configured to prompt subdivision of the category upon satisfaction of a first condition;

computer readable program code configured to designate the category as a parent category;

computer readable program code configured to solicit at least one subcategory nomination from users;

computer readable program code configured to solicit user input on appending at least one nominated subcategory to the parent category;

computer readable program code configured to append a nominated subcategory to the parent category upon satisfaction of a second condition;

wherein the second condition is a threshold comprising a predetermined number of user votes; and computer readable program code configured to solicit user input to reassign a user post from the parent category to at least one subcategory;

wherein soliciting user input on appending at least one nominated subcategory comprises soliciting user votes through the voice application.

3. The computer program product according to claim 1, wherein the first condition is a threshold comprising a predetermined number of user posts.

4. The computer program product according to claim 2, wherein said computer readable program code is configured to solicit user input to reassign a user post via soliciting user votes.

5. The computer program product according to claim 2, wherein said computer readable program code is further configured to reassign a user post from the parent category to at least one subcategory upon satisfaction of a third condition.

6. The computer program product according to claim 5, wherein said computer readable program code is configured to solicit user input to reassign a user post via soliciting user votes.

7. The computer program product according to claim 6, wherein the third condition is a threshold comprising a predetermined number of user votes.

8. The computer program product according to claim 2, wherein said computer readable program code is further configured to perform at least one taken from the group consisting of: soliciting user input to merge two or more subcategories during said soliciting of at least one subcategory nomination from users; soliciting user input to merge two or more subcategories after said soliciting of at least one subcategory nomination from users.

9. The computer program product according to claim 2, wherein said computer readable program code is further configured to perform at least one taken from the group consisting of: soliciting user comments or responses to a post and flagging the comments or responses with the same category as the post; adding a new category which is accessible to and usable by solely a user or limited group of users;

soliciting at least one additional round of user input to iteratively refine category or subcategory content; defining a category or subcategory along multiple dimensions.

10. The computer program product according to claim 2, wherein at least one taken from the following group consisting of (a), (b), (c) and (d) comprises audio user input: (a) the appended user posts; (b) the solicited at least one subcategory nomination from users; (c) the solicited user input on appending at least one nominated subcategory to the parent category; and (d) the solicited user input to reassign a user post from the parent category to at least one subcategory.

11. The computer program product according to claim 2, wherein at least one taken from the following group consisting of (a), (b), (c) and (d) comprises user voice input: (a) the appended user posts; (b) the solicited at least one subcategory nomination from users; (c) the solicited user input on appending at least one nominated subcategory to the parent category; and (d) the solicited user input to reassign a user post from the parent category to at least one subcategory.

* * * * *